March 3, 1936.  W. H. ALLEN  2,032,388
PROCESS OF PRODUCING CALCINED BORAX
Original Filed March 11, 1929
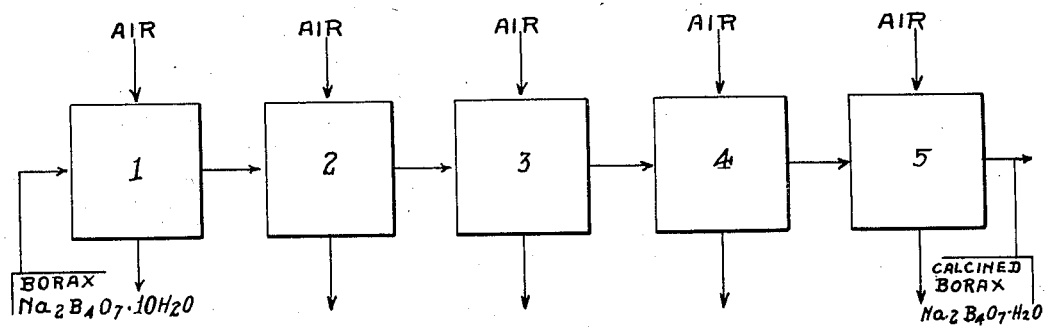
CONDITION OF AIR IN CHAMBERS
| 1 | 2 | 3 | 4 | 5 |
|---|---|---|---|---|
| TEMP. — 50–100°C | 65–150°C | 125–200°C | 175–260°C | 225–325°C |
| HUMIDITY .08–0.1 ABS | .06–.08 ABS | .04–.06 ABS | .02–.04 ABS | .00–.02 ABS |
Inventor
William H. Allen
By Lyon & Lyon
Attorneys Patented Mar. 3, 1936

2,032,388

UNITED STATES PATENT OFFICE 2,032,388

PROCESS OF PRODUCING CALCINED BORAX

William H. Allen, Trona, Calif., assignor to American Potash & Chemical Corporation, Trona, Calif., a corporation of Delaware Original application March 11, 1929, Serial No. 346,107. Divided and this application September 24, 1934, Serial No. 745,250

7 Claims. (Cl. 23—59)

This invention relates to a process of producing calcined borax. This application is a division of my co-pending application, Serial No. 346,107, filed March 11, 1929.

The ordinary borax of commerce is the fully hydrated form ($Na_2B_4O_7.10H_2O$). This product in a fine granular form has an apparent density of 0.90 to 1.0 and contains but 52.9 per cent of $Na_2B_4O_7$, the remaining 47.1 per cent of the product being water.

A considerable saving can be made in transportation charges if the fully hydrated borax of commerce can be properly converted to a partially dehydrated or calcined form. However, it is a well known characteristic of borax to intumesce or puff to a large volume when it is heated to bring about calcination. In the past, it has been considered impossible to produce a calcined borax containing less than three molecules of water of crystallization (approximately 21% of water) without having intumescence or puffing occur. As a result of this behavior of borax to intumesce upon heating, the dehydrated or partially dehydrated products on the market today under the name of "calcined borax" are very voluminous, dusty materials usually in the form of a powder. By "dusty material" is meant borax in such finely divided state and of such low density as to readily float on air like ordinary dust. Such a product may have an apparent density as low as .05 of that of water. The bulkiness of the product necessitates a considerable increase in the cost of containers, such as sacks, or barrels per ton of borax and increased freight rate, thus tending to offset the advantage to be gained by shipping a product containing less water.

Manufacturers of borax products have attempted to overcome this difficulty by fusing the calcined borax at higher temperatures to produce an essentially anhydrous dense product, known as "borax glass." Besides the additional expense involved, considerable difficulty is met with in this operation due to the bulkiness and porosity of the calcined borax and its resistance to the transfer of heat. It is also difficult to construct satisfactory fusion furnaces due to the highly corrosive nature of the molten borax. Another disadvantage of the borax glass is its very slow rate of solution in water.

It is the principal object of this invention to produce a calcined borax of a relatively dense nature without the necessity of fusing to a glass. It is another object of the present invention to produce a dense calcined borax having a relatively rapid rate of solution in water.

I have discovered that the production of a calcined borax without intumescence may be accomplished by subjecting crystal borax to the action of heated air or to other suitable gas in such a manner that the temperature of the air with which the borax is in contact never becomes high enough to cause the borax to melt or go into solution, either wholly or in part, in the remaining water of crystallization contained therein, provided that at the same time the humidity of the air in contact with the borax is kept low enough to cause the borax to be subjected to a dehydrating action. When borax is brought into contact with air having a partial pressure of water vapor below that exerted by the solid borax, so that moisture will continue to be transferred from the borax to the air and at the same time the air is kept at sufficiently low temperature that the borax will not melt, dehydration may be effected without intumescence or puffing of the borax. In the foregoing discussion of the action of borax in melting in its own water crystallization, it should be understood that in some cases the action may be so severe as to cause the entire mass undergoing dehydration to melt together into one liquid, but in the majority of cases where puffing is experienced the crystals melt up individually, and generally only partially. Thus, while in some cases the dehydrating conditions may not be such as to cause the whole body of borax to melt together, still on account of the individual crystals of borax melting either entirely or on their surface the water vapor becomes trapped and further dehydration proceeds with a puffing and enlargement of the crystals.

In accordance with the discovery of this invention, a process of calcining borax is provided in which the borax crystals or particles retain essentially the same shape and size as those of the originally hydrated material. Thus, by starting with a dustless granular borax, a relatively dense, dustless, granular calcined product is produced. It appears clearly that intumescence or puffing of borax upon heating, such as has been experienced in the prior attempts to calcine borax, is due to a state of fusion of the surface of the mass of borax undergoing dehydration, after which the further ebullition of water causes the puffing action. By calcining the borax in accordance with the principles of the present invention, always at a temperature below the melting point of the borax or below the point that the borax goes into solution in the remaining water of crystallization, intumescence or puffing is entirely avoided.

The present invention, together with various additional objects and advantages thereof will be best understood from a description of a preferred calcined borax and a preferred process of producing the same. For this purpose, there is hereafter described a process of calcining borax and the preferred calcined product.

The description is given in connection with the accompanying drawing, which is diagrammatic in character.

The temperature at which borax melts or dissolves in the water of crystallization present varies, depending upon the amount of water of crystallization present in the borax. In general, it is true that the higher the percentage of water of crystallization in the borax, the lower the temperature at which the borax melts or dissolves in its water of crystallization. It is further found that the absolute humidity of the water vapor in the air employed to calcine borax must be lower, as the water present in the borax being calcined becomes lower. This is true even though air of higher temperatures may be used in calcining borax having a small percentage of water of crystallization.

There is hereafter described a process of calcining borax in which the temperatures and humidity of air are controlled as the borax progressively loses its water of crystallization in order to properly calcine borax without puffing.

Granular borax ($Na_2B_4O_7 10H_2O$) is fed into chamber 1, where it is treated with a stream of air or other drying gas at a temperature of from 50 to 100° C., having an absolute humidity of between 0.08 and 0.1 pounds of water vapor per pound of bone dry air. The air passes through the chamber at such a rate that both the inlet and outlet air remains within these specified limits. After about fifteen minutes, dehydration has proceeded to such an extent that the borax will not melt in its remaining water of crystallization at the temperature employed in the next chamber and the borax is then transferred to this chamber 2. Its composition at this point corresponds approximately to the formula $Na_2B_4O_7 8H_2O$.

The air in chamber 2 is maintained between the temperature limits of 65 and 150° C. with an absolute humidity of between 0.06 and 0.08 pounds of water per pound of bone dry air. After remaining about fifteen minutes in this chamber, the borax is transferred to chamber 3. At this point in the process, it has a composition corresponding approximately to the formula $Na_2B_4O_7 6H_2O$ which has been found to be a sufficient dehydration to prevent melting at the temperature maintained in chamber 3.

The air in chamber 3 is maintained between the temperature limits of 125 and 200° C. and the absolute humidity between 0.04 and 0.06 pounds of water per pound of bone dry air. The borax, upon leaving chamber 3 has a composition corresponding approximately to the formula $Na_2B_4O_7 4H_2O$, at which time it is sufficiently dehydrated to prevent melting in chamber 4. In chamber 4, the air is maintained between the temperature limits of 175 to 260° C. and the absolute humidity of the water vapor between 0.02 and 0.04 pounds of water vapor per pound of bone dry air.

Borax from chamber No. 4 is fed into chamber 5 and has a composition corresponding approximately to the formula $Na_2B_4O_7 2H_2O$, and is sufficiently dehydrated to prevent melting in this chamber 5. In chamber 5, the air is maintained at a temperature between 225 and 325° C. and the absolute humidity of the air less than 0.02 pounds of water vapor per pound of bone dry air.

The borax leaving this chamber, after a period of about fifteen minutes in each of the chambers in turn, was found to consist essentially of monohydrate ($Na_2B_4O_7 H_2O$). The particles of this monohydrate of borax have essentially the same shape as those of the original dekahydrate ($Na_2B_4O_7 10H_2O$), but they are more opaque due to the process of dehydration.

The particles, however, are not sufficiently friable to crumble to a powder with ordinary handling, such as the product receives in commerce. The product produced moreover is rapidly soluble in water and thus considerably superior to borax glass made by fusion. Instead of being more bulky than the original borax, there was an actual shrinkage in material, as will be seen from the following data on the comparison of weight of anhydrous borax ($Na_2B_4O_7$) packed in standard 100 pound borax sacks.

|  | Apparent density | Gross weight per sack | Weight of $Na_2B_4O_7$ per sack |
| --- | --- | --- | --- |
| Borax dekahydrate ($Na_2B_4O_7 10H_2O$). | 0.90 | 100 lbs. | 52.9 lbs. |
| Calcined borax ($Na_2B_4O_7 H_2O$) as made by the process of this invention. | 0.72 | 80 | 73.4 |
| Puffed calcined borax | 0.054 | 6 | 5.5 |

While in the above table the product is shown as having an apparent density of 0.72, depending on such factors as rate of dehydration and percentage of water permitted in the final product, the product may possess an apparent density of between 0.5 and 0.9.

While in the process herein described, we have specified certain lower limits of humidity of the air going through the several chambers, the air may be passed through the chambers with humidities lower than those given, but the lower limits specified are those ordinarily obtainable without a special process of drying the air.

It will be readily seen that as the air passes through the chambers, its humidity automatically increases since it picks up water vapor from the borax. This causes the temperature of the air at the same time to decrease due to the sensible heat of the air being taken up to supply the latent heat of evaporation of water of crystallization of the borax. Thus, after the air is passed through one of the latter chambers of the series, its temperature and humidity are brought to those conditions of the air in the preceding chamber of the series. Thus, the air passing out of chamber 5 may be used as the air supply for chamber 4, and the air supply passing from chamber 4, used as the air supply for chamber 3, and so on in the series. Furthermore, in place of the series of chambers, a single long chamber may be used, so arranged that the borax and air are passed from end to end, counter-current to each other. In such an apparatus, the borax should be subjected to dehydrating conditions from about 1 to 3 hours. The time of calcination depends mainly upon the size of the crystals, since the controlling factor is the rate of diffusion of water outwardly from the interior of the crystals. The smaller the crystals possessed, the more rapidly they may be dehydrated without overheating. In such a counter-current process, sufficient air must be provided in order to maintain the proper exit conditions in contact with the fresh incoming borax. As previously stated, in connection with chamber 1, the temperature of this exit air should lie between 50 and 100° C. and the absolute humidity below 0.1 pounds of water vapor per pound of bone dry air.

While the process of the present invention is suitable for dehydrating borax to any desired extent so as to secure a borax having less water than the dekahydrate, which contains about 43 per cent of water, the process of the present invention is of special value in dehydrating borax to reduce the percentage of water in the borax to between the limits of 8 per cent and 21 per cent, or to dehydrate the borax so that it possesses less water of crystallization than three molecules and contains at least one molecule of water.

Moreover, while the process of the present invention has been described as applied to the calcination of borax dekahydrate ($Na_2B_4O_7.10H_2O$) other hydrates of sodium tetraborate, such as pentahydrate ($Na_2B_4O_7.5H_2O$) or mixtures of pentahydrate and dekahydrate are suitable. Moreover, the process of the present invention may be applied to various partially calcined products of either the dekahydrate or pentahydrate of borax, when the partial calcination of these products has been carried on in other manners, provided that such partial calcination has not excessively puffed the borax.

While the particular process herein described for the purpose of illustrating the invention is well adapted to carry out the objects of this invention, it is to be understood that various changes and modifications may be made without departing from the process of the invention, and the invention includes all such changes and modifications as come within the scope of the appended claims.

I claim:

1. A process of producing a calcined borax of relatively dense nature from relatively hydrated borax, which comprises subjecting the borax to the action of inert gas of progressively increasing temperature and decreasing absolute humidity while the calcination process proceeds, the said increasing temperature being held throughout the calcining process below the temperature which will cause the borax to undergo melting and puffing, the humidity of the gas being at all times sufficiently low that at the temperature of the gas, the gas is capable of absorbing water of crystallization from the borax undergoing calcination without incurring melting or puffing of said borax, the action of the heated gases on the borax being continued until a granular, dense, calcined product containing less than 21% water is produced.

2. A process of producing calcined borax from a relatively hydrated borax, which comprises subjecting the relatively hydrated borax to the action of an inert gaseous phase of progressively increasing temperature and progressively decreasing humidity as dehydration of the borax proceeds, the said increasing temperature being held throughout the calcining process below the temperature which will cause the borax to undergo melting and puffing, the humidity of the gas being maintained throughout the process sufficiently low that the gas is capable of absorbing water of hydration from the borax without causing puffing or melting of said borax, the process being continued until borax is calcined to a composition equivalent substantially to the monohydrate of sodium tetraborate.

3. A process of producing a calcined borax, which comprises subjecting crystal borax to the action of inert gas of progressively increasing temperatures and progressively decreasing water content as dehydration proceeds, the said increasing temperature being held throughout the calcining process below the temperature which will cause the borax to undergo melting and puffing, while the partial pressure of water vapor in the gas throughout the process is maintained sufficiently low that it is capable of absorbing water of hydration from the borax without causing melting or puffing of said borax, the action of the gas being continued until a granular product of dense nature containing less than 21% remaining water of crystallization is produced, the dehydrated granular particles retaining substantially the same shape as the crystals of the original borax.

4. A process of producing a calcined borax of relatively dense nature from a relatively hydrated borax, which comprises subjecting the borax to the action of inert gas of progressively increasing temperature and decreasing absolute humidity until a granular product corresponding substantially to the monohydrate is produced, the said increasing temperature being held between 50 and 100° C. while the borax composition corresponds to between $Na_2B_4O_7.10H_2O$ and $Na_2B_4O_7.8H_2O$, between 65 and 150° C. while the borax corresponds to $Na_2B_4O_7.8H_2O$ and $Na_2B_4O_7.6H_2O$, to between 125 to 200° C. while the borax composition corresponds to between $Na_2B_4O_7.6H_2O$ and $Na_2B_4O_7.4H_2O$, to between 175° C. and 260° C. while the borax composition corresponds to between $Na_2B_4O_7.4H_2O$ and $Na_2B_4O_7.2H_2O$, and between 225 and 325° C. while the borax composition corresponds to between $Na_2B_4O_7.2H_2O$ and $Na_2B_4O_7.1H_2O$, the humidity of the gas during said respective periods being respectively not greater than 0.1, 0.08, 0.06, 0.04, and 0.02 pounds of $H_2O$ per pound of dry air, whereby the temperature and humidity of the gas is held throughout the process sufficiently low that the borax undergoes calcination without melting or puffing of said borax.

5. A process of producing a calcined borax of relatively dense nature from a relatively hydrated borax, which comprises subjecting the borax to the action of inert gas of progressively increasing temperature and decreasing absolute humidity while the calcination process proceeds, until a granular product of dense nature containing less than 21% remaining water of crystallization is produced, the dehydrated granular particles retaining substantially the same shape as the crystals of the original borax, the said increasing temperature being held throughout the calcining process between the limits of 50 to 100° C., 65 to 150° C., 125 to 200° C., 175 to 260° C., and 225 to 325° C., whenever the water content of the borax undergoing calcination during the process is respectively between the limits of 10 to 8, 8 to 6, 6 to 4, 4 to 2, and 2 to 1 molecules of water of crystallization, respectively, while maintaining the humidity of the air during those respective periods of dehydration below respectively 0.1, 0.08, 0.06, 0.04 and 0.02 pounds of water per pound of dry air.

6. The method of producing calcined borax of relatively dense nature which comprises subjecting hydrated sodium tetraborate to the action of heated air of progressively increasing temperature and progressively decreasing humidity, controlling the temperature of the heated air so that it is between the range of 50–100° C. when the water content is between 8 and 10 molecules of water of crystallization, 65–150° C. when between 8 and 6 molecules of water of crystallization, 125–200° C. when between 6 and 4 molecules of water of crystallization, 175–260° C. when between 4 and 2 molecules of water of crystallization, 225–325° C. when between 2 and 1 molecules of water of crystallization and controlling the humidity of the heated air during the dehydration treatment so that it shall be less than 0.1 pound of water per pound of bone dry air for hydrates between 10 and 8 molecules of water of crystallization, less than 0.08 pound of water per pound of bone dry air when between 8 and 6 molecules of water of crystallization, less than 0.06 pound of water per pound of bone dry air when between 6 and 4 molecules of water of crystallization, less than 0.04 pound of water per pound of bone dry air when between 4 and 2 molecules of water of crystallization and less than 0.02 pound of water per pound of bone dry air when between 2 and 1 molecules of water of crystallization, and continuing the dehydration until less than 21% of water of crystallization remains.

7. A method of producing calcined borax of relatively dense nature, which comprises subjecting hydrated sodium tetraborate to the countercurrent action of heated air of controlled humidity, controlling the temperature of the heated air so that it is between 125 and 200° C. when between 6 and 4 molecules of water of crystallization; 175 and 260° C. when between 4 and 2 molecules of water of crystallization; 225 and 325° C. when between 2 and 1 molecules of water of crystallization; and controlling the humidity of the heated air during the dehydration so that it is less than 0.06 pound of water per pound of bone dry air when between 6 and 4 molecules of water of crystallization; less than 0.04 pound of bone dry air when between 4 and 2 molecules of water of crystallization; and less than 0.02 pound of bone dry air when between 2 and 1 molecules of water of crystallization.

WILLIAM H. ALLEN.